US007500067B2

(12) United States Patent  (10) Patent No.: US 7,500,067 B2
Rangarajan et al.  (45) Date of Patent: Mar. 3, 2009

(54) SYSTEM AND METHOD FOR ALLOCATING MEMORY TO INPUT-OUTPUT DEVICES IN A MULTIPROCESSOR COMPUTER SYSTEM

(75) Inventors: Madhusudhan Rangarajan, Round Rock, TX (US); Vijay B. Nijhawan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 281 days.

(21) Appl. No.: 11/392,272

(22) Filed: Mar. 29, 2006

(65) Prior Publication Data

US 2007/0233967 A1  Oct. 4, 2007

(51) Int. Cl.
*G06F 12/00* (2006.01)
(52) U.S. Cl. .................. 711/147; 711/148; 711/165; 711/205
(58) Field of Classification Search .......... 711/147, 711/148, 165, 205
See application file for complete search history.

(56) References Cited

U.S. PATENT DOCUMENTS

| | | | | |
|---|---|---|---|---|
| 6,424,992 | B2 * | 7/2002 | Devarakonda et al. | 709/203 |
| 2002/0161902 | A1 * | 10/2002 | McMahan et al. | 709/229 |
| 2003/0041271 | A1 * | 2/2003 | Nalawadi et al. | 713/300 |
| 2003/0125908 | A1 * | 7/2003 | Wynn et al. | 702/186 |
| 2003/0135708 | A1 * | 7/2003 | Rangarajan et al. | 711/202 |
| 2004/0158701 | A1 * | 8/2004 | Merkin | 713/2 |
| 2004/0205304 | A1 * | 10/2004 | McKenney et al. | 711/148 |
| 2005/0033948 | A1 * | 2/2005 | Wei | 713/1 |
| 2007/0073993 | A1 * | 3/2007 | Allen et al. | 711/170 |
| 2007/0083728 | A1 * | 4/2007 | Nijhawan et al. | 711/170 |

* cited by examiner

*Primary Examiner*—Reba I Elmore
(74) *Attorney, Agent, or Firm*—Baker Botts L.L.P.

(57) ABSTRACT

The present disclosure describes systems and methods for allocating memory in a multiprocessor computer system such as a non-uniform memory access (NUMA) machine having distribute shared memory. The systems and methods include allocating memory to input-output devices (I/O devices) based at least in part on which memory resource is physically closest to a particular I/O device. Through these systems and methods memory is allocated more efficiently in a NUMA machine. For example, allocating memory to an I/O device that i80s on the same node as a memory resource, reduces memory access time thereby maximizing data transmission. The present disclosure further describes a system and method for improving performance in a multiprocessor computer system by utilizing a pre-programmed device affinity table. The system and method includes listing the memory resources physically closest to each I/O device and accessing the device table to determine the closest memory resource to a particular I/O device. The system and method further includes directing a device driver to transmit data between the I/O device and the closest memory resource.

20 Claims, 2 Drawing Sheets

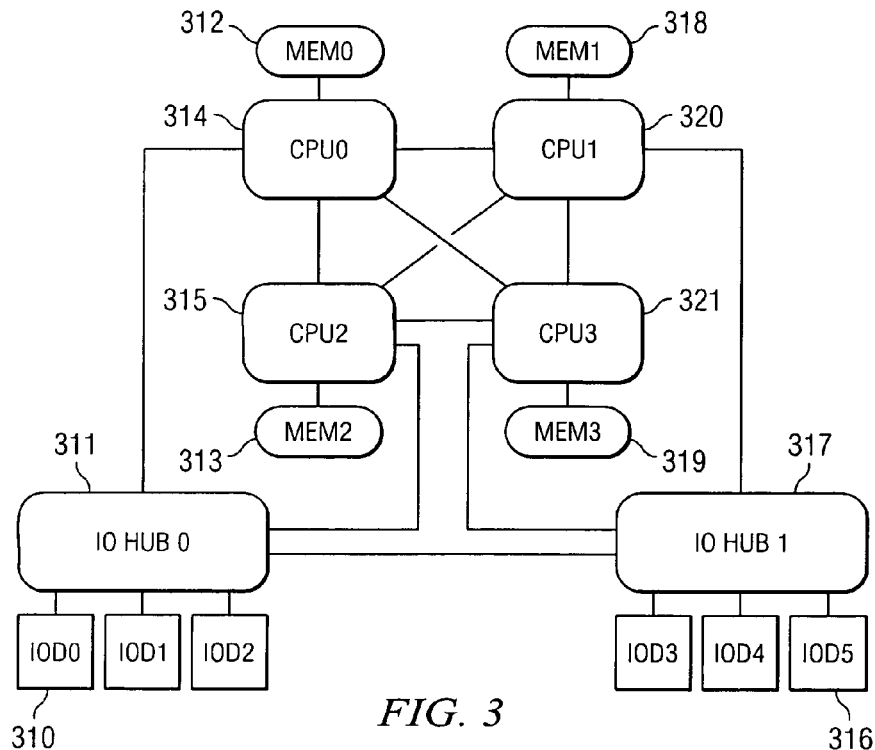
FIG. 3
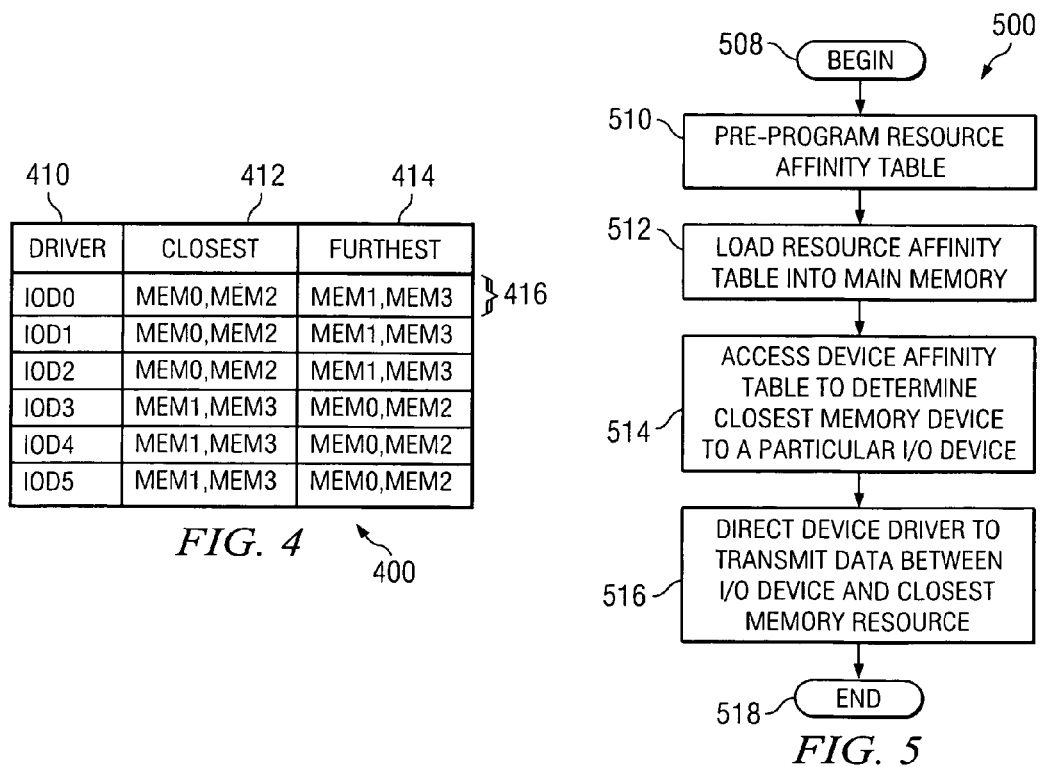
FIG. 4
FIG. 5

SYSTEM AND METHOD FOR ALLOCATING MEMORY TO INPUT-OUTPUT DEVICES IN A MULTIPROCESSOR COMPUTER SYSTEM

TECHNICAL FIELD

The present invention is related to the field of information handling systems and more specifically to a system and method for optimizing memory allocation to input-output devices in a shared memory multiprocessor computer system.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Memory allocation functions are useful for allocating memory in both single and multiprocessor computer systems. By definition, multiprocessor computer systems (multiprocessor computers) contain multiple processors that can execute multiple parts of a computer program or multiple distinct programs simultaneously, in a manner known as parallel computing. In general, multiprocessor computers execute multithreaded-programs or multiple single-threaded programs faster than conventional single processor computers that must execute programs sequentially. The actual performance advantage may depend upon a number of factors, including the degree to which parts of a multithreaded-program or multiple distinct programs can be executed in parallel and the architecture of the particular multiprocessor computer at hand.

Multiprocessor computers may be classified by how they share information among the processors. Shared-memory multiprocessor computers offer a common physical memory address space that all processors can access. Multiple processes or multiple threads within the same process can communicate through shared variables in memory that allow them to read or write to the same memory location in the computer. Message passing multiprocessor computers, in contrast, have a separate memory space for each processor, requiring processes in such a system to communicate through explicit messages to each other.

Shared-memory multiprocessor computers may further be classified by how the memory is physically organized. In distributed shared-memory computers, the memory is divided into modules physically placed near each processor and I/O device. Although all of the memory modules are globally accessible, a processor or I/O device can access memory placed nearby faster than memory placed remotely. Because the memory access time differs based on memory location, distributed shared memory systems are often called non-uniform memory access (NUMA) machines. By contrast, in centralized shared-memory computers, the memory is physically in one location. Centralized shared-memory computers are called uniform memory access (UMA) machines because the memory is equidistant in time from each of the processors and I/O devices. Both forms of memory organization typically use high-speed cache memory in conjunction with main memory to reduce execution time.

Multiprocessor computers with distributed shared memory are often organized into multiple nodes with one or more processors per node. These individual nodes usually contain a processor, memory, one or more input-output devices (I/O), and an interface connection network that connects all the nodes. The interface connection network operates using a protocol. Further information on multiprocessor computer systems in general and NUMA machines in particular can be found in Computer Architecture: A Quantitative Approach (2nd Ed. 1996), by D. Patterson and J. Hennessy.

The art of designing an I/O system is finding a design that meets goals for cost and variety of devices while avoiding bottlenecks to I/O performance. This means that components must be balanced between main memory and the I/O device, because performance can only be as good as the weakest link in the I/O chain. In a NUMA information handling system the memory is physically closer to an I/O device on the same node than a I/O device on another node. Consequently, I/O devices run faster if their memory is placed on the node containing the I/O device, since the controller for the I/O device would not need to communicate between nodes. Therefore, there exists a need to provide a system that uses pre-programmed information about which memory resource is closest to a particular I/O device to direct a device driver to transmit data between the selected I/O device and the closest memory resource when needed. In a UMA machine, in contrast, the memory is substantially equidistant from all I/O devices, and there is no performance advantage to placing an I/O device's memory in any particular range of physical addresses.

SUMMARY OF THE INVENTION

Therefore a need has arisen for a system and method for maximizing data transmission and improving performance in multiprocessor computers with distributed shared memory.

The present disclosure describes systems and methods for allocating memory in a multiprocessor computer system such as a non-uniform memory access (NUMA) machine having distributed shared memory. The systems and methods include allocating memory to input-output devices (I/O devices) based at least in part on which memory resource is physically closest to a particular I/O device. Through these systems and methods memory is allocated more efficiently in a NUMA machine. For example, allocating memory to an I/O device that is on the same node as a memory resource, reduces memory access time thereby maximizing data transmission. The present disclosure further describes a system and method for improving performance in a multiprocessor computer system by utilizing a pre-programmed device affinity table. The system and method includes listing the memory resources physically closest to each I/O device and accessing the device table to determine the closest memory resource to a particular I/O device. The system and method further includes directing a device driver to transmit data between the I/O device and the closest memory resource.

In one aspect, the information handling system comprises two or more processors and two or more memory resources in operative communication with the processors. The memory resources are distributed amongst the processors. In addition, the information handling system has two or more input-output devices in operative communication with the processors and the memory resources. The system comprises a pre-programmed device affinity table that lists the memory resources physically closest to each of the input-output devices. The operating system operates to access the device affinity table for allocating memory to the input-output devices.

In yet another aspect, the information handling system comprises a device affinity table. In addition, the system comprises a plurality of memory resources disposed at different locations within the system and a device driver in communication with the plurality of memory resources. The operating system operates to access the device affinity table to determine the memory resource that is physically closest to a selected input-output device and directs the device driver to transmit data between the selected input-output device and the closest memory resources.

In yet another aspect, a method comprising steps for pre-programming a device affinity table in the information handling system and accessing the device affinity table to determine a memory device within the system that is physically closest to a particular input-output. The method includes the step of directing a device driver to transmit data between the particular input-output device and the physically closest memory device.

The present disclosure includes a number of important technical advantages. One technical advantage is the utilization of a device affinity table to allocate memory to I/O devices. This allows the system to maximize data transmission for I/O devices within the information handling system thereby improving I/O performance measures e.g. response time and throughput. Additional advantages will be apparent to those of skill in the art and from the FIGURES, description and claims provided herein.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein:

FIG. 3 is an example of a NUMA topology, according to the present invention.

FIG. 4 is an example of a device affinity table, according to the present invention.

FIG. 5 is a flow diagram illustrating a method for optimizing memory resources for I/O devices, according to the present invention.

DETAILED DESCRIPTION OF THE INVENTION

Preferred embodiments of the invention and its advantages are best understood by reference to FIGS. 1-5 wherein like numbers refer to like and corresponding parts.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Figure 1:
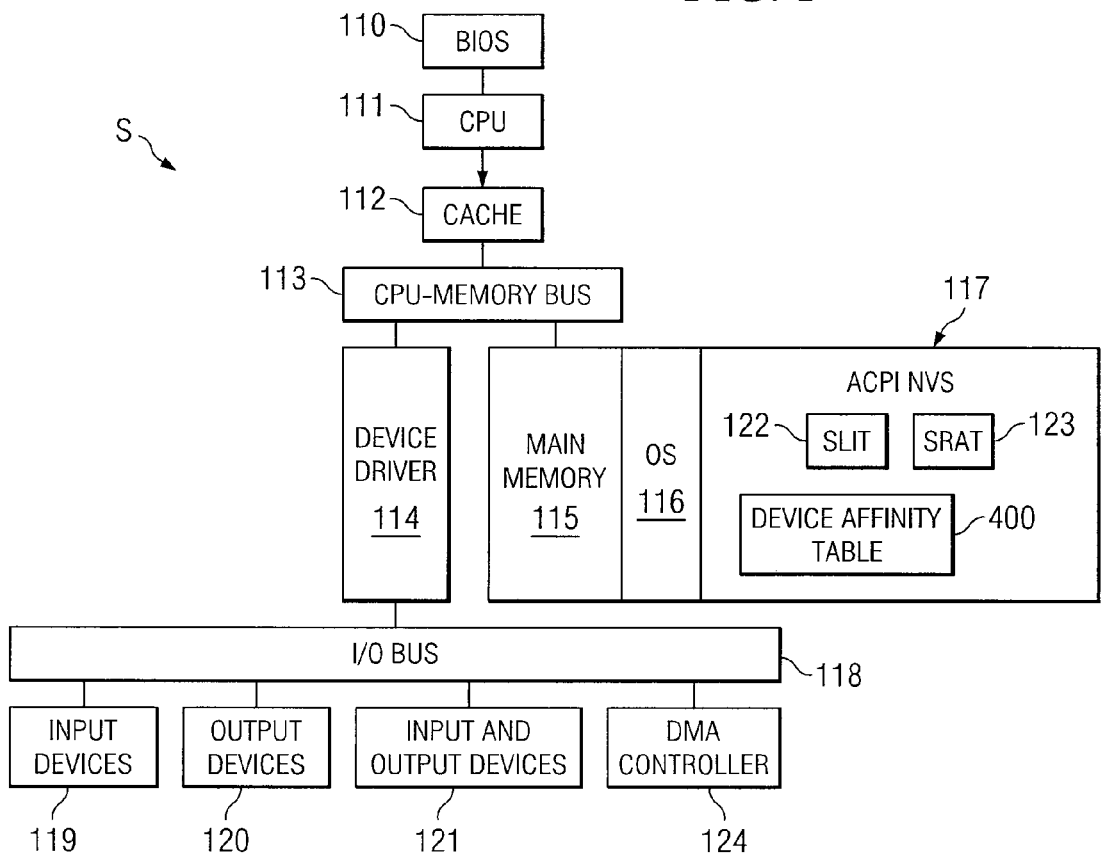
FIG. 1 shows a representation of an individual node of a multiprocessor distributed shared memory system, according to the present invention.

Now referring to FIG. 1, a representation of an individual node indicated generally at S, of a multiprocessor distributed shared memory system is shown. System S generally includes BIOS 110, CPU 111, Cache 112, CPU-Memory Bus 113, Device Driver 114, Main Memory 115, Operating System 116, ACPI memory 117, I/O Bus 118, Input Devices 119, Output Devices 120, and Input and Output Devices 121, SLIT 122, SRAT 123, and a device affinity table 400. The first instruction typically received by CPU 111 when System S is powered on are encoded instructions from basic input/output system BIOS code 110. During the initialization of System S, which may also be referred to as a boot sequence, a variety of diagnostics may preferably be performed to ascertain the availability and status of hardware devices and ensure proper operation of components. For example, during initialization, BIOS 110 preferably executes a boot program invoking a series of system checks to ascertain the location, number and identity of various devices connected to the computer system. The CPU 111 may store some of the information obtained from BIOS into its short-term cache 112 memory and transmit via CPU memory bus 113 other programs and data to main memory 115 for use in subsequent operations. Included among the programs loaded from BIOS 110, are SRAT 123, SLIT 122, and device affinity table 400 loaded into the ACPI memory 117 portion of main memory 115. As discussed below with reference to FIG. 4 device affinity table 400 preferably lists information on the proximity of memory resources to I/O devices 119, 120, and 121 within the information handling systems. This table will be accessed by the operating system (OS)116 as needed by device driver 114 to transfer data between memory resources and I/O devices 119, 120, and 121. Device driver 114 allows OS 116 to interact with I/O devices 119,120, and 121, via I/O bus 118. I/O bus 118 is a shared communication link between the I/O devices 119, 120, and 121.

Many information handling systems contain direct memory access controller (DMA) 124, a specialized processor for transferring data between memory and an I/O device, without intervention from the CPU, while the CPU goes on with other tasks. DMA controllers are used in known computer systems for offloading, from CPU 111, the tasks of performing data transfers to and from memory 115. If CPU 111 itself were used to transfer, for example, each byte of a program stored on an external floppy disk into system memory 115 for execution, operations would be severely slowed and overall system performance severely degraded. DMA controller 124 can instead be used to load the program, freeing CPU 111 for other operations. Typically, CPU 111 gives the DMA controller a start address and a byte count for data to be transferred to or from the memory 115. DMA controller 124 then proceeds to perform the data transfer.

A single operating system typically downloads the programs to the DMA controller in a multinode multiprocessor computer with distributed shared memory. Examples of suitable operating systems include UNIX-based operating systems such as Windows 2003, Windows 2000, Linux 4, etc.

Information handling systems typically contain a read only memory (ROM) chip that contains (BIOS)code 110. The BIOS contains all the code required to control I/O devices and perform a number of miscellaneous functions. The BIOS typically includes a Static Device affinity table (SRAT) 123 that provides a boot time description of the processor and memory ranges belonging to a system locality. The BIOS code may also include a System Locality Information Table (SLIT) 122 for optimizing a NUMA architecture system by providing information about the relative memory latency distances among system localities. These tables are typically copied into main memory 115 from BIOS 110 at boot time. SRATs and SLITs are described in sections 5.2.15 and 5.2.16 of the Advanced Configuration and Power Interface (ACPI) 2.0specification, Revision 3.0, and is hereby incorporated by reference. The ACPI specification is an industry standard interface for operating system-directed configuration. The ACPI specification describes the concept of proximity domains within a system and how devices in a system that belong to a proximity domain are tightly coupled, or "closer", to each other than to other devices in the system. For example, in a NUMA machine consisting of several nodes interconnected through a switch, the latency of a memory access operation from a processor to memory on the same node are typically shorter than the latency of a memory access operation on other nodes. The operating system uses this affinity information to determine the allocation of memory resources and the scheduling of software threads, thereby improving performance in multiprocessor computers with distributed shared memory.

As discussed herein, I/O devices may include any collection of interfaces that different functional units (sub-systems) of System S use to communicate with each other, or the signals (information) sent through those interfaces. Inputs are the signals received by the unit, and outputs are the signals sent from it. I/O devices are used by a person (or other system) to communicate with a computer. For instance, keyboards and mice are considered input devices 119 of a computer and monitors and printers are considered output devices 120 of a computer. Typical devices for communication between computers are both input and output devices 121, such as modems and network cards.

Figure 2:
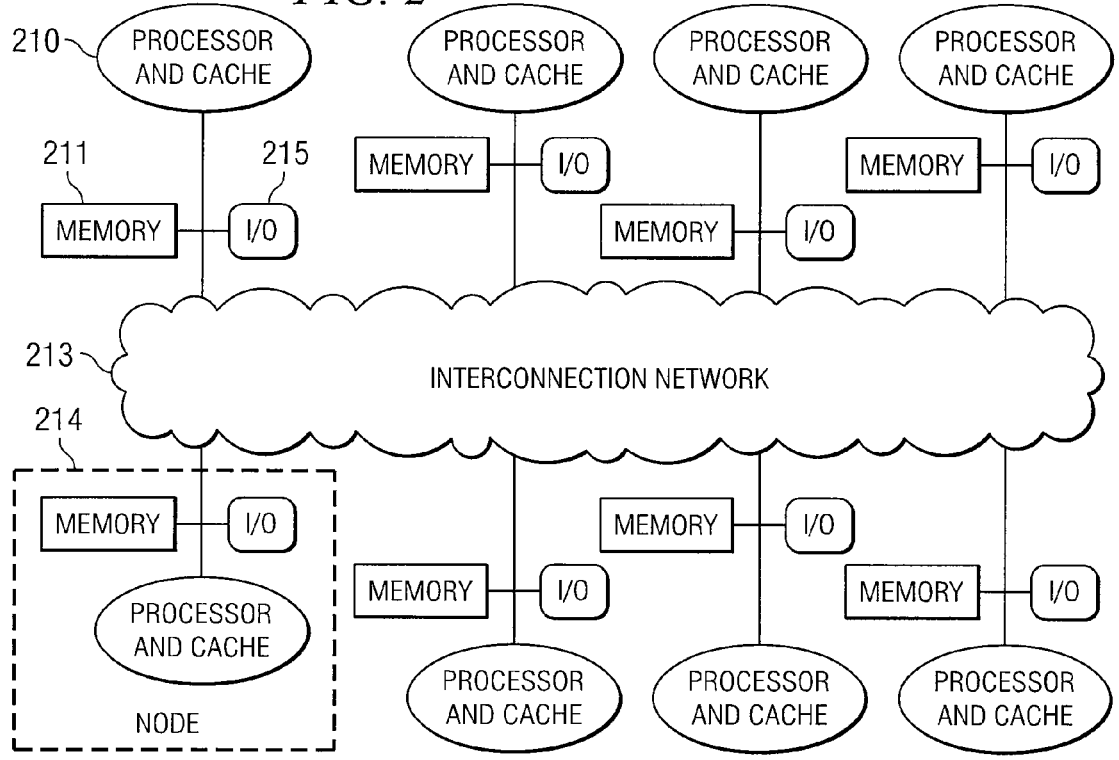
FIG. 2 is an example of the basic architecture of a distributed-memory system consisting of individual nodes containing a processor, some memory, some I/O devices, and an interconnection network that connects all the nodes, according to the present invention.

FIG. 2 is an example of the basic architecture of a distributed-memory system consisting of individual nodes 214 containing a processor 210, memory 211, I/O devices 215, and an interconnection network 213 that connects all the nodes. A distributed shared-memory system may also be called a non-uniform memory access (NUMA) system. A NUMA system includes multiple nodes as described above in FIG. 1. Each processor 210 in a node in the NUMA system may access shared-memory 211 in any of the other nodes in the system. In the present embodiment memory access may be non-uniform across the nodes 214. The NUMA topology name stems from the fact that processor 210 has lower access latency with respect to data stored in system memory 211 at its local node than with respect to data stored in the system memory at a remote node 214.

As an example, the I/O devices 310 on IO HUB 0 311 of FIG. 3, i.e. IOD0, IOD1, and IOD2, are physically closest to memory resources MEM0 312 and MEM2 313 because processors CPU0 314 and CPU2 315 are on the same node as IO Hub 0 311. Likewise, the I/O devices 316 on IO HUB 1 317 i.e. IOD3, IOD4, and IOD5, are physically closest to the memory resources MEM1 318 and MEM3 319 because processors CPU1 320 and CPU3 321 are on the same node as IO HUB 1 317.

FIG. 4 shows an example of a device affinity table based on the NUMA topology 400 of FIG. 3. The table of FIG. 4 lists each I/O device 410 in successive rows followed by information as to which memory resources are the closest 412 and which are the farthest 414. For example, in the case of I/O device, IOD0 shown in first row 416, the closest memory resources are MEM0 and MEM2 and the furthest memory resources are MEM1 and MEM3. Of course, it can be understood that the information in the device affinity table can be represented in a variety of different ways and may also contain information regarding the relative distance between memory resources and I/O devices.

In a preferred embodiment, the pre-programmed device affinity table 400 is included with BIOS as part of the SRAT 123 and/or SLIT 122 table. These tables are copied from BIOS code to the ACPI NVS (non volatile storage) 117 portion of main memory 115 during system configuration and initialization at boot time. The device affinity table 400 may then be accessed by an operating system as need to direct a CPU or DMA hardware to transfer data between the I/O device and the memory resource in closest proximity to that device.

FIG. 5 shows a flow diagram 500 of the steps for optimizing memory resources for I/O devices. The method begins 508 with the first step 510 of pre-programming a device affinity table. In a preferred embodiment, the pre-programming of the device affinity table 510 includes determining the relative distance between each I/O device (or port) and memory resource. The device affinity table may then be encoded on an EEPROM or flash memory device as a part of BIOS code. The BIOS may run off the onboard PROM, EPROM, flash memory or any other suitable memory when the computer is powered on and initializes. The BIOS may perform diagnostic tests on the hard drive, I/O devices, memory, video, chipset and other hardware. Subsequently, BIOS may decompress itself from the BIOS memory space into the system main memory for execution therefrom. In a preferred embodiment the device affinity table may then be loaded into main memory 512 by copying the SRAT and SLIT tables that include the appended device affinity table of information from BIOS to the ACPI NVS portion of main memory. The device affinity table can then be accessed by the operating system as necessary to determine the closest memory device to a particular I/O device 514. The operating system may then use the retrieved information to direct a particular I/O device's device driver to transmit data between the selected I/O device and closest memory device 516.

Of course, it can be appreciated that there may be multiple considerations including physical proximity that can bear on which memory resource a selected I/O device will access. In such cases, the physical proximity information contained within the device affinity table can be used as one piece of information used in the selection process of a memory resource for a selected I/O device.

Although the disclosed embodiments have been described in detail, it should be understood that various changes, substitutions and alterations can be made to the embodiments without departing from their spirit and scope.

What is claimed:

1. An information handling system comprising:
   at least two processors;
   at least two memory resources in operative communication with the processors and distributed amongst the processors;
   at least two input-output devices in operative communication with the processors and the memory resources;
   at least one of a System Locality Information Table (SLIT) and a Static Resource Affinity Table (SRAT) indicating distances between system components;
   a pre-programmed device affinity table, indicating relative physical distances between particular memory resources and particular input-output devices; and
   an operating system operable to access the device affinity table for allocating the memory resources to the input-output devices.

2. An information handling system according to claim 1 wherein the device affinity table comprises a Basic Input Output System (BIOS) code.

3. An information handling system according to claim 1, wherein the pre-programmed data comprises information relating to the relative physical distances between the input-output devices and the memory resources within the information handling system.

4. The information handling system according to claim 1 further comprising a device driver that uses the device affinity table to identify the closest memory location prior to transferring data between a memory resource and a selected input-output device.

5. The information handling system according to claim 1 wherein the processors are in communication with the memory resources via a network.

6. The information handling system according to claim 1 wherein the processors and the memory resources comprise a non-uniform memory access (NUMA) system.

7. The information handling system according to claim 1 wherein the device affinity table comprises an industry standard interface for operating system-directed configuration.

8. The information handling system according to claim 1 wherein the device affinity table comprises an advance configuration and power interface (ACPI) table.

9. A system for allocating memory to input-output devices comprising:
   a plurality of input-output devices;
   a plurality of memory resources disposed at different locations within the system;
   a device driver in communication with the plurality of memory resources;
   at least one of a Static Resource Affinity Table (SRAT) and a System Locality Information Table (SLIT) indicating distances between system components;
   a device affinity table indicating relative physical distances between particular memory resources and particular input-output devices; and
   an operating system operable to access the device affinity table to determine the memory resource that is physically closest to a selected input-output device and direct the device driver to transmit data between the selected input-output device and the closest memory resources.

10. The system of claim 9 wherein the device affinity table is located in a Basic Input Output System (BIOS) code associated with the operating system.

11. The system of claim 9 wherein the device affinity table comprises the relative physical distances between the input-output device and each memory resource.

12. The system of claim 9 wherein the memory resources comprise a non-uniform memory access (NUMA) system.

13. The system of claim 9 wherein the device affinity table comprises an industry standard interface for operating system-directed configuration.

14. The system of claim 9 wherein the device affinity table comprises an advance configuration and power interface (ACPI) table.

15. A method comprising:
   storing at least one of a System Locality Information Table (SLIT) and a Static Resource Affinity Table (SRAT) in an information handling system;
   storing a device affinity table in the information handling system, the device affinity table indicating relative physical distances between particular memory resources and particular input-output devices of the information handling system;
   accessing the device affinity table to determine a memory device within the information handling system physically closest to a particular input-output device within the information handling system; and
   directing a device driver to transmit data between a particular input-output device and the physically closest memory device.

16. A method according to claim 15 wherein the pre-programmed device affinity table is located in a Basic Input Output System (BIOS) code associated with the operating system.

17. A method according to claim 15 wherein the pre-programmed device affinity table is copied into main memory during system initialization and configuration.

18. A method according to claim 15 wherein the pre-programmed device affinity table is used as one of many other factors to consider in determining which memory device the input-output device should utilize.

19. A method according to claim 15 wherein the pre-programmed table is read by the operating system when the system is powered on.

20. A method according to claim 15 further comprising the operating system directing a device driver to the physically closest memory device a particular input-output device should use in order to maximize data transmission.

* * * * *